United States Patent
Kamel et al.

(10) Patent No.: US 11,326,038 B2
(45) Date of Patent: May 10, 2022

(54) CRUSHED FOAM COATING

(71) Applicant: Rohm and Haas Company, Collegeville, PA (US)

(72) Inventors: Nader N. Kamel, Doylestown, PA (US); Debra A. Kline, Lansdale, PA (US); Paul Nedwick, Lansdale, PA (US)

(73) Assignee: ROHM AND HAAS COMPANY, Collegeville, PA (US)

( * ) Notice: Subject to any disclaimer, the term of this patent is extended or adjusted under 35 U.S.C. 154(b) by 0 days.

(21) Appl. No.: 15/772,232

(22) PCT Filed: Dec. 6, 2016

(86) PCT No.: PCT/US2016/065093
§ 371 (c)(1),
(2) Date: Apr. 30, 2018

(87) PCT Pub. No.: WO2017/100168
PCT Pub. Date: Jun. 15, 2017

(65) Prior Publication Data
US 2018/0312724 A1 Nov. 1, 2018

Related U.S. Application Data

(60) Provisional application No. 62/264,954, filed on Dec. 9, 2015.

(51) Int. Cl.
| | | |
|---|---|---|
| *C09D 201/00* | (2006.01) | |
| *C08J 9/36* | (2006.01) | |
| *C08J 9/30* | (2006.01) | |
| *C08J 9/28* | (2006.01) | |
| *C08J 9/00* | (2006.01) | |
| *D06N 3/00* | (2006.01) | |
| *C08J 7/04* | (2020.01) | |
| *B05D 3/12* | (2006.01) | |
| *B05D 3/00* | (2006.01) | |
| *B05D 1/00* | (2006.01) | |
| *B05D 3/02* | (2006.01) | |

(52) U.S. Cl.
CPC .............. *C08J 9/365* (2013.01); *B05D 1/00* (2013.01); *B05D 3/02* (2013.01); *B05D 3/12* (2013.01); *B05D 3/20* (2013.01); *C08J 7/042* (2013.01); *C08J 7/0427* (2020.01); *C08J 9/0061* (2013.01); *C08J 9/28* (2013.01); *C08J 9/30* (2013.01); *C08J 9/36* (2013.01); *C09D 201/00* (2013.01); *D06N 3/0045* (2013.01); *D06N 3/0063* (2013.01); *C08J 2300/12* (2013.01); *C08J 2433/06* (2013.01); *D06N 2209/0853* (2013.01); *D06N 2211/122* (2013.01)

(58) Field of Classification Search
CPC .................................................. C09D 201/00
See application file for complete search history.

(56) References Cited

U.S. PATENT DOCUMENTS

| | | | | |
|---|---|---|---|---|
| 4,049,848 A | * | 9/1977 | Goodale | .................... C08J 9/34 |
| | | | | 427/244 |
| 4,265,965 A | * | 5/1981 | Chancier | .................. C08J 9/365 |
| | | | | 181/294 |
| 4,277,384 A | | 7/1981 | Arkens | |
| 4,289,823 A | | 9/1981 | Arkens | |
| 4,305,863 A | | 12/1981 | Adachi et al. | |
| 4,384,056 A | | 5/1983 | Schmidt et al. | |
| 4,403,003 A | | 9/1983 | Backhouse | |
| 4,518,730 A | | 5/1985 | Gastaldo | |
| 4,539,361 A | | 9/1985 | Siol et al. | |
| 5,204,233 A | | 4/1993 | Ogasawara et al. | |
| 5,237,004 A | | 8/1993 | Wu et al. | |
| 5,614,256 A | * | 3/1997 | Wierer | ................. C09D 127/06 |
| | | | | 427/244 |
| 7,056,449 B2 | | 6/2006 | Hoefler | |
| 7,265,166 B2 | | 9/2007 | Gebhard et al. | |
| 7,768,602 B2 | | 8/2010 | LaFleur et al. | |
| 7,829,626 B2 | | 11/2010 | Chiou et al. | |
| 7,989,082 B2 | | 8/2011 | Vanrheenen | |
| 8,916,012 B2 | | 12/2014 | Qin et al. | |
| 2004/0220306 A1 | | 11/2004 | Kageishi et al. | |
| 2008/0017071 A1 | | 1/2008 | Moebus et al. | |
| 2009/0077412 A1 | | 3/2009 | Langford et al. | |
| 2010/0273382 A1 | * | 10/2010 | Nandi | ...................... C09D 5/18 |
| | | | | 442/76 |
| 2011/0159309 A1 | * | 6/2011 | Jiang | ........................ C09D 7/69 |
| | | | | 428/520 |
| 2012/0121903 A1 | | 5/2012 | Betremieux et al. | |
| 2012/0160400 A1 | | 6/2012 | Calewarts et al. | |
| 2012/0164200 A1 | | 6/2012 | Qin et al. | |
| 2012/0164467 A1 | | 6/2012 | Sobczak | |
| 2013/0157012 A1 | | 6/2013 | Qin et al. | |
| 2014/0099469 A1 | | 4/2014 | Abuto et al. | |
| 2014/0102650 A1 | | 4/2014 | Qin et al. | |
| 2015/0184016 A1 | * | 7/2015 | La Fleur | .............. C09D 133/08 |
| | | | | 523/221 |
| 2015/0197659 A1 | | 7/2015 | Kamel et al. | |

FOREIGN PATENT DOCUMENTS

| | | |
|---|---|---|
| CN | 203825222 U | 9/2014 |
| EP | 41125 A1 | 12/1981 |

(Continued)

*Primary Examiner* — Dah-Wei D. Yuan
*Assistant Examiner* — Kristen A Dagenais-Englehart

(57) ABSTRACT

Provided is a process for producing a coating on a substrate comprising one or more steps of crushing a dried layer of a foamed aqueous coating composition, wherein the aqueous coating composition comprises a collection of multi-stage copolymer particles having a weight average diameter of 2-20 μm, wherein said multi-stage copolymer particles comprise a core having a glass transition temperature (Tg) of 20° C. or less. Also provided is a coated substrate made by that process.

4 Claims, No Drawings

(56) References Cited

FOREIGN PATENT DOCUMENTS

| JP | 2004339614 A | 12/2004 |
| KR | 807365 | 3/2008 |
| KR | 2008077445 | 8/2008 |
| WO | 2009/077412 A2 | 6/2009 |
| WO | 2014/097017 A1 | 6/2014 |

\* cited by examiner

CRUSHED FOAM COATING

A widely used method of coating substrates is the application of a crushed foam coating. A foam coating does not penetrate porous substrates as much as an ordinary coating does, thus preserving the original properties of the substrate. For example, when the substrate is a fabric, use of a foam coating reduces the penetration of the coating into the fabric, thus preserving the soft drape and "hand" of the original fabric. Drying and then crushing the foam reduces the thickness of the coating, which is desirable in a variety of uses, such as coated fabrics used as drapery. However, after coating to standard thickness and then crushing with a standard crushing process, it is desirable to provide a crushed foam coating that has greater thickness than other crushed foam coatings have after the same standard coating and crushing processes. It is also desirable that, after coating to standard thickness and then crushing with a standard crushing process, it is desirable to provide a crushed foam coating that has higher add-on (mass of coating per unit of area) that previously known coatings. It is also desirable that, after coating to standard thickness and then crushing with a standard crushing process, it is desirable to provide a crushed foam coating that is softer to the touch (i.e., that has a softer "handle") than previously known coatings.

U.S. Pat. No. 7,829,626 describes aqueous compositions comprising a "polymeric duller component." U.S. Pat. No. 7,829,626 describes conventional coatings applied directly to a substrate and dried. It is desired to provide crushed foam coatings that provide one or more of the following improvements over previously known crushed foam coatings: greater thickness at the same application and crushing conditions; greater add-on at the same application and crushing conditions; softer "handle," or any combination.

The following is a statement of the invention.

A first aspect of the present invention is a process for producing a coating on a substrate comprising one or more steps of crushing a dried layer of a foamed aqueous coating composition, wherein the aqueous coating composition comprises a collection of multi-stage copolymer particles having a weight average diameter of 2-20 μm, wherein said multi-stage copolymer particles comprise a core having a glass transition temperature (Tg) of 20° C. or less.

A second aspect of the present invention is an article comprising a coating on a substrate produced by process of the first aspect.

The following is a detailed description of the invention.

As used herein, the following terms have the designated definitions, unless the context clearly indicates otherwise.

A "coating composition" is a liquid composition that is designed to be applied as a layer on the surface of a substrate. Coating compositions contain a continuous liquid medium in which one or more additional ingredients are dissolved or dispersed. After a layer of a coating composition is applied to a surface, the liquid medium is evaporated or allowed to evaporate, and the remaining ingredients are said to form a "coating" on the surface.

A composition is said herein to be a liquid if it is in the liquid state at 25° C.

A "polymer," as used herein is a relatively large molecule made up of the reaction products of smaller chemical repeat units. Polymers may have structures that are linear, branched, star shaped, looped, hyperbranched, crosslinked, or a combination thereof. Polymers having a single type of repeat unit are called homopolymers, and polymers that have more than one type of repeat unit are called copolymers. Copolymers may have the various types of repeat units arranged randomly, in sequence, in blocks, in other arrangements, or in any mixture or combination thereof. Polymers have weight-average molecular weight of 1,000 or more.

As used herein "weight of polymer" means the dry weight of polymer.

Molecules that can react with each other to form the repeat units of a polymer are known herein as "monomers." The repeat units so formed are known herein as "polymerized units" of the monomer.

An organic polymer is a polymer in which all polymerized units are units of monomers that are organic compounds. Organic compounds are compounds that contain carbon atoms except for a relatively small number of carbon compounds that are generally considered to be inorganic. Carbon compounds that are generally considered to be inorganic are, for example, binary compounds (such as carbon oxides and carbon disulfide), ternary compounds (such as metallic cyanides, metallic carbonyls, phosgene, and carbonyl sulfide), and metallic carbonates (such as calcium carbonate and sodium carbonate).

Vinyl monomers have the structure

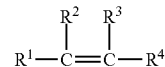

where each of $R^1$, $R^2$, $R^3$, and $R^4$ is, independently, a hydrogen, a halogen, an aliphatic group (such as, for example, an alkyl group), a substituted aliphatic group, an aryl group, a substituted aryl group, another substituted or unsubstituted organic group, or any combination thereof.

Some suitable vinyl monomers include, for example, styrene, substituted styrenes, dienes, ethylene, other alkenes, dienes, ethylene derivatives, and mixtures thereof. Ethylene derivatives include, for example, unsubstituted or substituted versions of the following: ethenyl esters of substituted or unsubstituted alkanoic acids (including, for example, vinyl acetate and vinyl neodecanoate), acrylonitrile, (meth)acrylic acids, (meth)acrylates, (meth)acrylamides, vinyl chloride, halogenated alkenes, and mixtures thereof. As used herein, "(meth)acrylic" means acrylic or methacrylic; "(meth)acrylate" means acrylate or methacrylate; and "(meth)acrylamide" means acrylamide or methacrylamide. "Substituted" means having at least one attached chemical group such as, for example, alkyl group, alkenyl group, vinyl group, hydroxyl group, carboxylic acid group, other functional groups, and combinations thereof. In some embodiments, substituted monomers include, for example, monomers with more than one carbon-carbon double bond, monomers with hydroxyl groups, monomers with other functional groups, and monomers with combinations of functional groups.

As used herein, acrylic monomers are monomers selected from (meth)acrylic acid, alkyl esters of (meth)acrylic acid, alkyl esters of (meth)acrylic acid having one or more substituent on the alkyl group, (meth)acrylamide, N-substituted (meth)acrylamide, and mixtures thereof. As used herein, vinylaromatic monomers are monomers selected from styrene, alpha-alkyl styrenes, and mixtures thereof.

One class of vinyl monomers is multiethylenically unsaturated monomers, which are monomers having two or more polymerizable carbon-carbon double bonds. Examples of multiethylenically unsaturated monomers are divinyl benzene, allyl (meth)acrylate, and multiacrylate esters of alkylene polyols. Alkylene polyols are alkanes in which two or more hydrogen atoms are replaced with hydroxyl groups.

A multiacrylate ester of an alkylene polyol is a compound that has the structure that would be formed if two or more of the hydroxyl groups on the polyol each reacted with acrylic acid or methacrylic acid to form an ester linkage. Multiethylenically unsaturated monomers in which all the carbon-carbon double bonds have equal reactivity toward free radical polymerization are known herein as "crosslinking monomers." Multiethylenically unsaturated monomers in which at least one of the carbon-carbon double bonds has higher reactivity toward free radical polymerization than at least one of the other carbon-carbon double bonds are known herein as "graftlinking monomers."

As used herein, a latent crosslinking vinyl monomer is a vinyl monomer that has one or more polymerizable vinyl groups and that also has one or more reactive groups that do not react during vinyl polymerization but that are capable of undergoing a crosslinking reaction after the latex polymer has been applied to a substrate.

A liquid is said herein to be "aqueous" if it contains 50% or more water by weight based on the weight of the liquid. When additional ingredients are dispersed in an aqueous liquid, the liquid is referred to as an aqueous medium. Ingredients that are dissolved (rather than dispersed) in the liquid become part of the aqueous medium.

A polymer made by aqueous emulsion polymerization is known herein as a "latex" polymer. Latex polymers exist as particles distributed throughout an aqueous medium.

As used herein, a vinyl polymer is a polymer in which 90% or more or the polymerized units are vinyl monomers. As used herein, an "acrylic" polymer is a polymer in which 30% or more of the polymerized units are selected from acrylic monomers and also in which 75% or more of the polymerized units are selected from the group consisting of acrylic monomers and vinylaromatic monomers. The percentages are by weight based on the weight of the polymer.

A collection of particles may be characterized by the weight-average diameter (WAD) of the particles in the collection. Also, the uniformity of the distribution of the diameters may be characterized by W20, which is the weight percent of the collection of particles made of particles that have diameter that is greater than 0.8 times WAD and that is less than 1.2 times WAD. Also, the uniformity of the distribution of the diameters may be characterized by W10, which is the weight percent of the collection of particles made of particles that have diameter that is greater than 0.9 times WAD and that is less than 1.1 times WAD. The weight-average diameter is measured by Disc Centrifuge Photosedimentometry, using the following conditions: The instrument is a Photosedimentometer ("DCP") (CPS Instruments, Inc.) that separates modes by centrifugation and sedimentation through a sucrose gradient. The samples are prepared by adding 1-2 drops into 10 cc DI water containing 0.1% sodium lauryl sulfate. A volume of 0.1 cc of the sample is injected into the spinning disc filled with 15 cc. sucrose gradient. Samples are analyzed relative to a polystyrene calibration standard. Specific conditions are: sucrose gradient 2-8%; disc speed 10,000 rpm; calibration standard is 895 nm diameter polystyrene.

Some spherical particles have homogeneous index of refraction, which means that the index of refraction is the same throughout the volume of the particle. Other spherical particles have inhomogeneous index of refraction, which means that different volume portions of the spherical particles have different indices of refraction. Some inhomogeneous spherical particles are called gradient index ("GRIN") particles; in a GRIN particle, the values of the index of refraction are distributed with spherical symmetry about the center of the particle, and the index of refraction changes monotonically (either increasing or decreasing, and either continuously or stepwise or a combination thereof) from the center of the particle to the outer surface.

Spherical particles may be characterized by the K value, which is a measure of the compressibility of the particles. K value is defined in "Investigation for Surface Morphology and Mechanical Property Variations of Single Polymer Particles", Journal of Applied Polymer Science Volume 104 (4) 2007, 2350, Dong Ok Kim, Jeong Hee Jin. K10 is the K value at 10% compression, and K0 is the K value at full compression. K values are measured at a compression rate of 0.79 gram-force/sec.

Glass transition temperature (Tg) is characterized by differential scanning calorimetry (DSC) at 10° C. per minute, using the midpoint method.

A multi-stage polymer is a polymer made by two or more separate polymerization processes, where the second polymerization process is made in the presence of the polymer that was made in the first polymerization process, and any successive polymerization process, if performed, is carried out in the presence of the polymers that were made in the previous polymerization processes. Each one of these separate polymerization processes produces a polymer known herein as a "stage." A "core" is a stage that is not the final stage.

As used herein, a foam is a composition in which bubbles of gas are present, distributed in a liquid medium. Foams have density of 0.6 g/cc or less. When a liquid composition has been subjected to a process that introduces gas bubbles and turns the liquid composition into a foam, the resulting foam is referred to as a "foamed composition."

After a layer of an aqueous composition has been applied to a surface to form a layer, that layer is considered to be "dried" when the amount of water in the layer is 20% or less by weight based on the weight of the layer, or when the amount of water is half or less of the amount of water that was present in the layer when the layer was first applied to the surface, whichever amount is lower.

When an layer of an aqueous coating composition has been applied to the surface of a substrate and dried, the resulting layer is known herein as a "coating," and the article that comprises both the substrate and the coating is known herein as a "coated substrate."

As used herein, "crushing" is a process of subjecting a layer of a dried aqueous coating composition to mechanically applied pressure, to reduce the thickness of the coating. Mechanical pressure may be applied to the coating, for example, by applying mechanical pressure to the coated substrate, for example by pressing the coated substrate between flat plates or by passing the coated substrate between nip rollers under pressure.

A binder polymer is a polymer that is present in an aqueous coating composition, either in a dissolved state or as dispersed particles or a combination thereof. Binder polymers form a coherent film after a layer of the aqueous coating composition is applied to a substrate under the conditions of use of the present invention. Some binder polymers require exposure to temperature above 25° C. in order to form a coherent film, and other binder polymers do not.

An anionic surfactant is a compound that contains one or more hydrocarbon group and one or more anionic group. The hydrocarbon group is a chemical group that contains only carbon and hydrogen atoms and that contains 6 or more carbon atoms.

As used herein, a mineral pigment is an inorganic compound that has the form of a collection of solid particles having weight-average particle size from 50 nm to 1 mm.

As used herein, a compound is insoluble in water if the amount of that compound that will dissolve in 100 grams of water at 25° C. is 0.1 gram or less.

As used herein, an oil is a compound that is insoluble in water at 25° C. and that contains one or more hydrocarbon group that has 10 or more carbon atoms.

The "hand" is a characteristic of a fabric, which may be woven or nonwoven, and which may be coated or uncoated. The "hand" refers to the easiness with which the fabric drapes over a small shape such as a human hand. For purposes of the present invention, "hand" is the opposite of stiffness.

When a ratio is said herein to be X:1 or greater, it is meant that the ratio is Y:1, where Y is greater than or equal to X. For example, if a ratio is said to be 3:1 or greater, that ratio may be 3:1 or 5:1 or 100:1 but may not be 2:1. Similarly, when ratio is said herein to be W:1 or less, it is meant that the ratio is Z:1, where Z is less than or equal to W. For example, if a ratio is said to be 15:1 or less, that ratio may be 15:1 or 10:1 or 0.1:1 but may not be 20:1.

The practice of the present invention involves the use of an aqueous coating composition that contains a collection of multi-stage copolymer particles having a weight average diameter of 2-20 μm and a core having a glass transition temperature (Tg) of 20° C. or less.

Preferred multi-stage copolymer particles contain a core having Tg of 10° C. or lower; more preferably 0° C. or lower. Preferred cores are are vinyl polymers; more preferred are vinyl polymers in which the amount of polymerized units of acrylic monomers is, by weight based on the weight of the vinyl polymer, 50% or more; more preferably 75% or more; more preferably 95% or more. Preferably, the core contains polymerized units of one or more unsubstituted alkyl ester of (meth)acrylic acid. More preferably, the core contains polymerized units of one or more unsubstituted alkyl ester of acrylic acid in which the alkyl group has 2 or more carbon atoms; more preferably 3 or more carbon atoms. More preferably, the core contains polymerized units of one or more unsubstituted alkyl esters of acrylic acid in which the alkyl group has 20 or fewer carbon atoms; more preferably 12 or fewer carbon atoms; more preferably 8 or fewer carbon atoms. Preferably, the amount of polymerized units of unsubstituted alkyl esters of (meth)acrylic acid in the core is, by weight based on the weight of the stage, 50% or more; more preferably 70% or more.

Preferably, core has polymerized units of one or more graft linker. Preferably, the core contains polymerized units of graftlinker in an amount of 0.5% or more; more preferably 1% or more. Preferably, the core contains polymerized units of graftlinker in an amount of 10% or lower; more preferably 7% or lower.

Preferred are multistage copolymer particles that additionally contain one or more stage having a Tg greater than 20° C.; more preferably 30° C. or higher.

Among stages having Tg of higher than 20° C., preferred are vinyl polymers; more preferred are vinyl polymers in which the amount of polymerized units of acrylic monomers is, by weight based on the weight of the vinyl polymer, 50% or more; more preferably 75% or more; more preferably 95% or more. Preferably, the stage having Tg of higher than 20° C. contains polymerized units of one or more unsubstituted alkyl ester of (meth)acrylic acid. More preferably, the stage having Tg of higher than 20° C. contains polymerized units of one or more unsubstituted alkyl ester of methacrylic acid in which the alkyl group has 6 or fewer carbon atoms; more preferably 4 or fewer carbon atoms. Preferably, the stage having Tg of higher than 20° C. also contains polymerized units of one or more unsubstituted alkyl ester of acrylic acid having 8 or fewer carbon atoms; more preferably 4 or fewer carbon atoms. Preferably, the amount of polymerized units of unsubstituted alkyl ester of (meth)acrylic acid in the stage having Tg of higher than 20° C. is, by weight based on the weight of the stage, 50% or more; more preferably 70% or more.

Multi-stage copolymer particles may have any morphology, including a shell surrounding a core, a shell partially surrounding a core, multi-lobe structure, islands-in-a-matrix structure, other structures, or a combination thereof. Preferably, a stage having Tg of more than 20° C. surrounds the core.

Preferably, a collection of multi-stage copolymer particles has weight average diameter of 15 μm or less; more preferably 10 μm or less. Preferably, a collection of multi-stage copolymer particles has weight average diameter of 3 μm or more.

Preferably, the weight ratio of the core to the stage having Tg of more than 20° C. is 1:1 or higher; more preferably 1.5:1 or higher; more preferably 2.3:1 or higher. Preferably, the weight ratio of the stage having Tg of 20° C. or less to the stage having Tg of more than 20° C. is 19:1 or lower; more preferably 9:1 or lower; more preferably 5.7:1 or lower.

The multi-stage copolymer particles preferably have K10 value of less than $1.9\text{E}+10\text{ N/m}^2$. Preferably, the multi-stage copolymer particles have ratio of K0:K10 of greater than 1.5:1, more preferably greater than 3:1.

Preferably the W20 of the collection of multi-stage copolymer particles is 80% or higher; more preferably 90% or higher; more preferably 95% or higher. Preferably the W10 of the collection of multi-stage copolymer particles is 75% or higher; more preferably 80% or higher; more preferably 85% or higher.

Preferably, the collection of multi-stage copolymer particles is a collection of GRIN copolymer particles. Among GRIN particles, preferably, the index of refraction is lower at the center of the particle than at the outer surface. Among GRIN particles, preferably the difference between the highest index of refraction and the lowest is 0.005 or more; more preferably 0.01 or more. Among GRIN particles, preferably the difference between the highest index of refraction and the lowest is 0.1 or less; more preferably 0.06 or less; more preferably 0.02 or less.

One way to characterize the amount of multi-stage copolymer particles is the dry weight of multi-stage copolymer particles, expressed as a percentage based on the total solid weight of the aqueous coating composition. By that characterization, the amount of multi-stage copolymer particles is preferably 0.5% or more; more preferably 1% or more. By that characterization, the amount of multi-stage copolymer particles preferably is 15% or less; more preferably 12% or less; more preferably 10% or less; more preferably 8% or less.

Preferably the aqueous coating composition contains one or more binder polymers in addition to the collection of multistage copolymer particles. A preferred binder polymer is present as a collection of dispersed particles in an aqueous medium; more preferred are dispersed particles produced by emulsion polymerization. Preferred binder polymers are acrylic polymers. Preferred binder polymers either have no polymerized units of multiethylenically unsaturated monomers, or have 1% or less polymerized units of multiethylenically unsaturated monomers, by weight based on the weight of the binder polymer. Preferred binder polymers have 0.5% to 10% by weight of polymerized units of one or more latent crosslinking vinyl monomers. Preferred latent crosslinking vinyl monomers are vinyl monomers having trialkoxysilyl groups, vinyl monomers having one or more carbonyl groups, alkylol(meth)acrylcamide monomers, vinyl monomers having one or more epoxy group, dicarboxylic acids (such as, for example, itaconic acid), quaternary dimethylaminoethymethacrylate-epichlorohydrin, and mixtures thereof. More preferred latent crosslinking vinyl monomers are vinyl monomers having trialkoxysilyl groups, vinyl monomers having one or more carbonyl groups, alkylol(meth)acrylcamide monomers, vinyl monomers having one or more epoxy group and mixtures thereof.

Preferred binder polymers have Tg of 30° C. or higher; more preferably 50° C. or higher. Preferred binder polymers have Tg of 100° C. or lower.

Preferably, the total amount of solid polymer in the aqueous coating composition, by weight based on the total weight of the aqueous coating composition, is 5% or more; more preferably 10% or more; more preferably 15% or more; more preferably 20% or more. Preferably, the total amount of solid polymer in the aqueous coating composition, by weight based on the total weight of the aqueous coating composition, is 50% or less; more preferably 40% or less; more preferably 30% or less.

Preferably, the dry weight ratio of multi-stage polymer particles to binder polymer is 0.01:1 or higher; more preferably 0.02:1 or higher; more preferably 0.025:1 or higher. Preferably, the dry weight ratio of multi-stage polymer particles to binder polymer is 0.4:1 or lower; more preferably 0.3:1 or lower; more preferably 0.2:1 or lower.

Preferably, the aqueous coating composition contains one or more anionic surfactant. Preferred anionic surfactants have one or more hydrocarbon groups having 8 or more carbon atoms. Preferably, the aqueous coating composition contains one or more anionic surfactants in which the hydrocarbon group is a linear alkyl group having 12 or more carbon atoms; more preferably 14 or more carbon atoms; more preferably 16 or more carbon atoms. Preferably, the aqueous coating composition contains one or more anionic surfactants in which the anionic group is a sulfosuccinate group, a sulfate group, a carboxylate group, or a mixture thereof. More preferably, the aqueous coating composition contains one or more anionic surfactants in which the anionic group is a carboxylate group.

Preferably, the total amount of all anionic surfactants in the aqueous coating composition, by weight based on the solid weight of all polymers in the aqueous coating composition, is 3% or more; more preferably 4% or more; more preferably 5% or more. Preferably, the total amount of all anionic surfactants in the aqueous coating composition, by weight based on the solid weight of all polymers in the aqueous coating composition, is 10% or less; more preferably 9% or less; more preferably 8% or less.

The aqueous coating composition optionally contains one or more mineral pigment. When one or more mineral pigments are present, preferably the particles of the mineral pigment are dispersed in the aqueous medium. Preferred mineral pigments are titanium dioxide, calcium carbonate, clay, and mixtures thereof.

When one or more mineral pigments are present, the amount of mineral pigment may be characterized by the ratio W1:W2, where W1 is the dry weight of all binder polymers plus the dry weight of all multi-stage copolymer particles, and W2 is the sum of the dry weights of all mineral pigments. Preferably W1:W2 is 0.8:1 or higher; more preferably 1:1 or higher; more preferably 1.2:1 or higher. Preferably W1:W2 is 2:1 or lower; more preferably 1.8:1 or lower; more preferably 1.6:1 or lower; more preferably 1.4:1 or lower.

Preferably, the total amount of water in the aqueous coating composition, by weight based on the weight of the aqueous coating composition, is 70% or less; more preferably 60% or less; more preferably 55% or less. Preferably, the total amount of water in the aqueous coating composition, by weight based on the weight of the aqueous coating composition, is 49% or more.

Preferably, the aqueous coating composition either contains no defoamer or, if defoamer is present, the amount of defoamer, by weight based on the dry weight of binder polymer, is 0.01% or less. Typical defoamers are insoluble oils and silicone polymers. Preferably, the total amount of all insoluble oils and silicone polymers in the aqueous coating composition, by weight based on the dry weight of binder polymer, is either zero or is 0.01% or less.

In preferred embodiments, an initial aqueous coating composition is provided that is not a foam, and that initial aqueous coating composition is subjected to a process that introduces gas bubbles and turns the liquid composition into a foam. Preferably, the initial aqueous coating composition contains various ingredients that are dissolved or dispersed or a combination thereof in the aqueous medium. Preferably, the density of the initial aqueous coating composition is 07. g/cc or higher; more preferably 0.8 g/cc or higher; more preferably 0.9 g/cc or higher. Preferably, the density of the initial aqueous coating composition is 1.5 g/cc or lower; more preferably 1.4 g/cc or lower; more preferably 1.3 g/cc or lower.

Processes that introduce gas bubbles involve, for example, mechanical agitation, injection of gas from a source at pressure higher than atmospheric pressure, and mixtures thereof. Preferred are processes that include mechanical agitation.

When the aqueous coating composition has become a foamed composition, preferably the density is 0.05 g/cc or higher; more preferably 0.08 g/cc or higher; more preferably 0.1 g/cc or higher; more preferably 0.13 g/cc or higher. When the aqueous coating composition has become a foamed composition, preferably the density is 0.5 g/cc or lower; more preferably 0.4 g/cc or lower; more preferably 0.3 g/cc or lower; more preferably 0.2 g/cc or lower.

Preferred substrates have one dimension that is 1 cm or smaller, and the other two dimensions are 10 cm or larger. Preferred substrates are polymer films, woven fabrics, unbonded mats of fibers, and bonded nonwoven fabrics; more preferred are woven fabrics and bonded nonwoven fabrics; more preferred are woven fabrics.

When a layer of the foamed aqueous coating composition has been applied to the substrate, it is useful to characterize the thickness of that layer prior to any drying or crushing. Preferably that thickness is 5 μm or more; more preferably 10 μm or more; more preferably 20 μm or more. Preferably that thickness is 70 μm or less; more preferably 50 μm or less; more preferably 30 μm or less.

Preferably, the layer of aqueous coating composition on the surface of the substrate is dried by exposing the layer to heated air. Such exposure is preferably accomplished by either placing the coated substrate into an oven or by passing the coated substrate through an oven. The temperature of the heated air during the drying process is preferably 70° C. or higher; more preferably 80° C. or higher; more preferably 90° C. or higher. The temperature of the heated air during the drying process is preferably 115° C. or lower; more preferably 110° C. or lower. The duration of time during which the coated substrate is exposed to the heated air during a drying process is preferably 1 minute or more; more preferably 2 minutes or more; more preferably 4 minutes or more. The duration of time during which the coated substrate is exposed to the heated air during a drying process is preferably 20 minutes or less; more preferably 12 minutes or less; more preferably 8 minutes or less.

After the drying process is concluded, the amount of water in the dried coating is preferably, by weight based on the weight of the dried coating, 0.5% or more; more preferably 1% or more; more preferably 2% or more. After the drying process is concluded, the amount of water in the dried coating is preferably, by weight based on the weight of the dried coating, 15% or less; more preferably 10% or less.

After the drying process, the dried coating is crushed. The preferred method of crushing is to pass the coated substrate between parallel rollers that are configured so that a mechanical force pushes the rollers toward each other. The mechanical force is characterized by the parameter FLINEAR, which is the total mechanical force exerted on the rollers divided by the length of the rollers. Preferably, FLINEAR is 2 kgf/cm (11.2 lbf/in) or greater; more preferably 4 kgf/cm (22.4 lbf/in) or greater; more preferably 5 kgf/cm (28 lbf/in) or greater. Preferably, FLINEAR is 9 kgf/cm (50.4 lbf/in) or less; more preferably 8 kgf/cm (44.8 lbf/in) or less; more preferably 7 kgf/cm (39.2 lbf/in) or less.

After an aqueous coating composition has been foamed, applied to a substrate, dried, and crushed, the result is referred to as a crushed foam coating. After a first layer of a crushed foam coating has been formed on the surface of a substrate, preferably one or more additional layers of crushed foamed coatings are then formed on the surface of the previous crushed foam coating. For each subsequent layer, all of the suitable and preferred characteristics, including the composition of the aqueous coating composition and the characteristics of the steps of forming the crushed foam coating, are the same as discussed above.

After all of the layers of crushed foam coating have been formed, the resultant coating is preferably heated. Preferably, the coating it heated to a sufficient temperature and for a sufficient time, so that the reactive groups on the latent crosslinking monomers, if any are present, react to form crosslinks. This heating step is known herein as the cure heating step.

Preferably, the crushed foam coating is cured by exposing the layer to heated air. Such exposure is preferably accomplished by either placing the coated substrate into an oven or by passing the coated substrate through an oven. The temperature of the heated air during the curing process is preferably 150° C. or higher; more preferably 160° C. or higher; more preferably 170° C. or higher. The temperature of the heated air during the curing process is preferably 210° C. or lower; more preferably 190° C. or lower. The duration of time during which the coated substrate is exposed to the heated air during the curing process is preferably 1 minute or more; more preferably 2 minutes or more; more preferably 4 minutes or more. The duration of time during which the coated substrate is exposed to the heated air during the drying process is preferably 20 minutes or less; more preferably 12 minutes or less; more preferably 8 minutes or less.

After the curing process is concluded, the amount of water in the cured coating is, by weight based on the weight of the cured coating, 0% to less than 2%; more preferably 0% to 1%.

One preferred use for the present invention is to produce draperies by a process that includes applying a crushed foam coating to a woven fabric. The crushed foam coating provides excellent opacity, which is often desired in draperies.

When producing a crushed foam coating, it is desired that the "add-on" be high. Add-on is a characteristic of the finished, cured crushed foam coating. Add-on is the weight of coating per unit area of the substrate surface. If two aqueous coating compositions are prepared, and if those two aqueous coating compositions are foamed, applied, dried, crushed, and cured using identical processes, then the coating with the higher add-on is considered to have superior add-on.

When producing a crushed foam coating, it is desired that the final thickness be high. If two aqueous coating compositions are prepared, and if those two aqueous coating compositions are foamed, applied, dried, crushed, and cured using identical processes, then the coating with the higher thickness is considered to have superior thickness.

In the past, other approaches have been considered and/or used for improving crushed foam coatings. For example, one such approach is the inclusion of gas-filled hollow polymer particles. Some examples of gas-filled hollow polymer particles are Expancel™ microspheres (AkzoNobel). Such particles are considered to expand when the coating is heated during the drying and/or curing steps of a crushed-foam process. It is considered that the use of such particles can adversely impact the appearance of the finished product by creating a surface that is not smooth.

Preferably, in the practice of the present invention, the aqueous coating composition contains no gas-filled hollow polymer particles. It is considered that coatings made according to the present invention are superior to coatings made with gas-filled hollow polymer particles because coatings made according to the present invention would be more compact and uniform It is considered that one benefit of the use of the method of the present invention is that the resulting coatings have a smooth appearance upon crushing.

Generally, it is considered that coatings made by the method of the present invention will have excellent performance in of, or in any combination of, the following features: wash durability, dry clean durability, and flexibility at relatively low temperature.

The following are examples of the present invention.

GRIN particles were made according to the methods disclosed in U.S. Pat. No. 7,829,626. GRIN particles were made by first forming a seed particle by aqueous emulsion polymerization. The seed particle had weight-average diameter of 0.56 µm. The seed formed 0.031% by weight of the final GRIN particle. A core was formed by aqueous emulsion polymerization in the presence of the seed particle. The core composition was 96% butyl acrylate and 4% allyl methacrylate, by weight based on the weight of the first stage. The second stage composition was 96% methylmethacrylate and 4% ethyl acrylate, by weight based on the weight of the second stage. The weight ratio of the first stage to the second stage was 80:20.

The resulting collection of GRIN polymer particles had weight-average diameter of between 4 and 5 µm, had one Tg below −20° C., and had another Tg above 50° C.

Binder polymer was an acrylic latex polymer having polymerized units of a latent crosslinking monomer. Formulations were as follows. "Ex" means example, and "CEx" means comparative example. In Examples 2, 3, and 4, the binder latex was mixed with the GRIN latex, and the resulting mixture was then mixed with the remaining ingredients. All four formulations maintained a constant weight ratio, on a wet basis, of the sum of binder latex plus GRIN particle latex to the pigment slurries.

TABLE I formulations (amounts shown are grams of wet material)

| Material | % solids | CEx 1 | Ex 2 | Ex 3 | Ex 4 |
|---|---|---|---|---|---|
| binder | 50 | 385.70 | 366.44 | 347.13 | 308.56 |
| GRIN | 30 | 0 | 19.25 | 38.57 | 77.14 |
| clay | 68 | 167.37 | 167.37 | 167.37 | 167.37 |
| TiO$_2$ | 77 | 35.89 | 35.89 | 35.89 | 35.89 |
| water | 0 | 71.72 | 71.72 | 71.72 | 71.72 |
| SDSS | 35 | 5.35 | 5.35 | 5.35 | 5.35 |
| ALS | 30 | 1.80 | 1.80 | 1.80 | 1.80 |
| Thickener | 18 | 0.48 | 0.48 | 0.48 | 0.48 |
| AmNit | 100 | 5.95 | 5.95 | 5.95 | 5.95 |
| AmSt | 35 | 25.73 | 25.73 | 25.73 | 25.73 |

SDSS = sodium dioctylsulfosuccinate
ALS = ammonium lauryl sulfate
Thickener = ACRYSOL ™ ASE-95NP, from the Dow Chemical Company
AmNit = ammonium nitrate
AmSt = ammonium stearate Each formulation was tested as follows.

A piece of 70% polyester/30% cotton woven fabric was stretched over a 41.9 cm×76.2 cm (16.5×30 inch) pin frame and placed on a 34.3 cm×68.6 cm (13.5×27 inch) block. A doctor blade was adjusted to have a gap of 25 µm.

200 g of the formulation was added to the bowl of a standard KITCHENAID™ stand mixer. Using the whisk attachment, the compound was whipped using the "high" setting for 2 minutes and 30 seconds. The foam was then smoothed out by lowering the speed to a setting of "2" for an additional 30 seconds.

The foam was then applied to the fabric by drawing down the foam from the top to the bottom using the doctor blade to produce a uniform coating. The pin frame with the wet foam coating was then removed from the block and placed into a 104° C. (220° F.) oven for 5 minutes.

After the 5 minutes, the fabric was removed from the pin frame and put through a Birch Brothers padder to crush the dry coating. The pressure of the top and bottom rollers was set to 0.41 megapascal (60 psi), which equals a 5.91 kgf/cm (33.12 lbf/inch) force; with a speed of 8.44 meters (27.7 feet) per minute. After crushing, the fabric was then put back onto the pin frame and 2 more coats were applied with drying and crushing occurring between each coat.

Once all 3 coats were applied, dried, and crushed, the resulting curtain panel was cured in a 177° C. (350° F.) oven for 5 minutes. The finished product was then evaluated for add on and thickness. Results were as follows:

TABLE II

Results

| Measurement | CEx 1 | Ex 2 | Ex 3 | Ex 4 |
|---|---|---|---|---|
| Add-On, in g/m$^2$ | 257 | 304 | 364 | 422 |
| (oz/yard$^2$) | (7.58) | (8.95) | (10.73) | (12.45) |
| Thickness, in µm | 8.89 | 11.63 | 15.60 | 17.45 |
| (mil) | (0.350) | (0.458) | (0.614) | (0.687) |

Larger amounts of GRIN particle latex resulted in higher add-on and greater thickness. Additionally, it is observed that the presence of the GRIN beads causes a higher thickness than would be expected from comparative coatings. That is, the comparative coating CEx 1 shows add-on of 257 g/m$^2$ and thickness of 8.89 µm. Conventionally, it would be expected that if the add-on were increased, for example, by 18%, then the thickness would also increase 18%. However, coating Ex 2 shows add-on of 18% higher than that of CEx 1, and coating Ex 2 shows thickness that is 31% increase over CEx 1, far thicker than the expected 18%. Similarly, when compared to CEx 1, the coating Ex 3 shows 42% increase in add-on and 75% increase in thickness. Similarly, when compared to CEx 1, the coating Ex 4 shows 64% increase in add-on and 96% increase in thickness. In all three examples, the % increase in thickness is far higher than the % increase in add-on.

It is contemplated that this ability to build disproportionately high thickness in the crushed foam coating will allow the process of the present invention to provide crushed foam coatings having a softer handle than comparable previously known coatings.

What is claimed is:

1. A process for producing a coating on a substrate comprising one or more steps of crushing a dried layer of a foamed aqueous coating composition made by a process comprising:
    (a) introducing gas into the aqueous coating composition to produce a wet foam,
    (b) applying a layer of the wet foam to a substrate such that the layer has a thickness of from 5 µm to 70 µm,
    (c) drying the layer of wet foam to a water content of 2% to 20% by weight, to produce a layer of dried foam, and
    (d) crushing the layer of dried foam to produce the layer of crushed dried foam, wherein the aqueous coating composition comprises one or more binder polymers and a collection of multi-stage copolymer particles having a core and a shell, having a weight average diameter of 2 to 20 µm, wherein said multi-stage copolymer particles are multi-stage graded refractive index (GRIN) copolymer particles having a K10 value of less than 1.9E+10 N/m$^2$ and a W20 of 80% or higher, wherein the core has a glass transition temperature (Tg) of 20° C. or less, wherein the shell has a glass transition temperature (Tg) of more than 20° C.

2. The process of claim 1, further comprising the step of heating the dried layer of a foamed aqueous coating composition after the step of crushing the dried layer of a foamed aqueous coating composition.

3. The process of claim 1, wherein the aqueous coating composition further comprises one or more surfactants.

4. The process of claim 1 wherein the process comprises, after the step (d), repeating the sequence of steps (b), (c), and (d) one or more times.

* * * * *